United States Patent
Rodrian et al.

(10) Patent No.: US 6,546,344 B1
(45) Date of Patent: Apr. 8, 2003

(54) MAGNETIC ANOMALY SENSOR SYSTEM

(75) Inventors: James A. Rodrian, Grafton, WI (US); Donald R. Janke, Milwaukee, WI (US)

(73) Assignee: Banner Engineering Corporation, Minneapolis, MN (US)

( * ) Notice: Subject to any disclaimer, the term of this patent is extended or adjusted under 35 U.S.C. 154(b) by 250 days.

(21) Appl. No.: 09/608,650

(22) Filed: Jun. 30, 2000

Related U.S. Application Data (60) Provisional application No. 60/142,114, filed on Jul. 2, 1999.

(51) Int. Cl.⁷ ............................................. G01R 29/08
(52) U.S. Cl. ......................................... 702/65; 324/331
(58) Field of Search ............................... 702/65, 38, 66, 702/150, 189; 340/870.19, 933, 934; 355/182; 324/301, 302, 312, 331, 348, 219, 244, 260

(56) References Cited

U.S. PATENT DOCUMENTS

| | | | |
|---|---|---|---|
| 3,649,958 A | 3/1972 | Koerner | 340/38 L |
| 3,714,626 A | 1/1973 | Koerner | 340/38 L |
| 3,825,889 A | 7/1974 | Koerner | 340/38 L |
| 3,942,258 A | 3/1976 | Stucki et al. | 33/361 |
| 3,978,396 A | * 8/1976 | Inouye et al. | 324/329 |
| 4,052,595 A | 10/1977 | Erdmann et al. | 235/92 TC |
| 4,427,943 A | 1/1984 | Cloutier et al. | 324/326 |
| 4,430,722 A | 2/1984 | Massen et al. | 708/425 |
| 4,509,131 A | 4/1985 | Krasnjanski | 702/148 |
| 4,524,932 A | 6/1985 | Bodziak | 246/247 |
| 4,675,606 A | 6/1987 | Ganguly | 324/244 |
| 5,408,179 A | 4/1995 | Sampey et al. | 324/253 |
| 5,455,768 A | 10/1995 | Johnson et al. | 702/142 |
| 5,491,475 A | 2/1996 | Rouse et al. | 340/933 |
| 5,570,023 A | 10/1996 | Certenais | 324/345 |
| 5,737,173 A | 4/1998 | Ross et al. | 361/160 |
| 5,748,108 A | 5/1998 | Sampey et al. | 340/933 |
| 5,777,580 A | * 7/1998 | Janky et al. | 342/457 |
| 5,850,192 A | 12/1998 | Turk et al. | 340/933 |

OTHER PUBLICATIONS

Caruso, M. et al., "A New Perspective on Magnetic Field Sensing", *Sensors Expo, Chicago*, 7 pgs., (Oct. 6, 1998).

* cited by examiner

*Primary Examiner*—Marc S. Hoff
*Assistant Examiner*—Edward Raymond
(74) *Attorney, Agent, or Firm*—Merchant & Gould (57) ABSTRACT

The present invention is directed to a method and apparatus for measuring a magnetic field and determining whether an anomaly is present based on the magnetic field measurement and a measured ambient magnetic field. The present invention is also directed to a method and apparatus for measuring the intensity of the magnetic field by implementing operations to essentially eliminate error components that arise due to factors including offsets and gains affecting the intensity signal processing.

8 Claims, 6 Drawing Sheets

MAGNETIC ANOMALY SENSOR SYSTEM

RELATED APPLICATIONS

This application claims the benefit of Provisional Patent Application Ser. No. 60/142,114, filed Jul. 2, 1999 and entitled "MAGNETIC VEHICLE SENSOR SYSTEM".

TECHNICAL FIELD

The present invention is directed to methods and devices for magnetic field measurement and more specifically, detection of magnetic anomalies present in a detection zone.

BACKGROUND OF THE INVENTION

The field of the invention is vehicle detection devices and systems, and particularly, systems which magnetically detect the presence of a vehicle.

The earth's magnetic field is normally constant over time, at a given location. When a ferro-magnetic object moves to a specific location, the earth's magnetic field, at that location, is perturbed. Since most vehicles contain ferro-magnetic material, their presence causes a perturbation in the earth's magnetic field.

Various sensors have been developed to detect vehicles by measuring the perturbation of the earth's magnetic field. The prior art indicates that they are used primarily to classify the type of vehicle, and measure the speed, direction of travel, and presence of a moving vehicle. These sensors function by measuring short duration perturbations (AC phenomenon) in the earth's magnetic field.

The prior art suggests that existing magnetic sensors can be used to detect nonmoving vehicles. However, when a magnetic vehicle sensor is used as part of a control system to control machinery (such as car wash equipment) the existing devices do not adequately protect against false detection or missed detection of vehicles. Reliable detection of non-moving vehicles requires accurate measurement of a steady-state perturbation (DC phenomenon) of the earth's magnetic field.

SUMMARY OF THE INVENTION

To accurately detect the presence of a non-moving vehicle, the absolute magnitude of the earth's ambient magnetic field must be known. The present invention is a system which includes means for producing a signal that indicates no vehicle is near a sensor. During, or just after, the assertion of this signal, the earth's ambient magnetic field is measured with the sensor and the resulting value is saved in non-volatile memory. This signal is asserted during the initial start-up, or whenever physical changes are made near the sensor (equipment moved or added, building changes, etc.). Following loss, and restoration of power to the system, the value of the ambient magnetic field is retrieved from the non-volatile memory enabling the system to immediately detect a vehicle without manual intervention.

Another aspect of the invention is to monitor long term changes that may occur in the ambient magnetic field. Measurements are made at regular intervals when vehicles are not present and these measurements are filtered to provide a more accurate measurement of the ambient magnetic field.

Yet another aspect of the present invention is the continuous calibration of the magnetic field sensors.

DESCRIPTION OF THE PREFERRED EMBODIMENT

Figure 1:
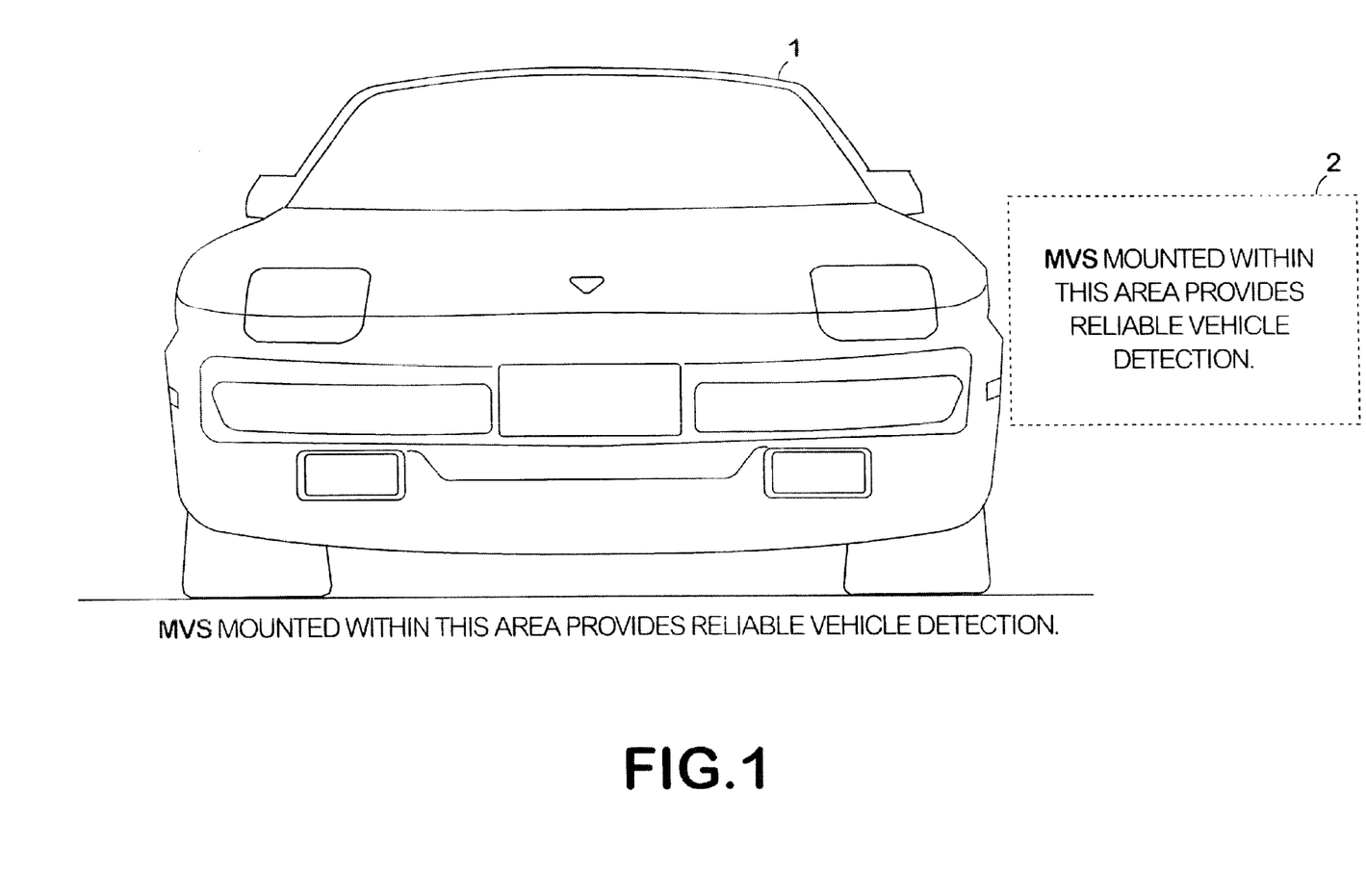
FIG. 1 is a pictorial representation of a vehicle showing the preferred location of a magnetic vehicle sensor (MVS) which detects the presence of the vehicle.
Figure 2:
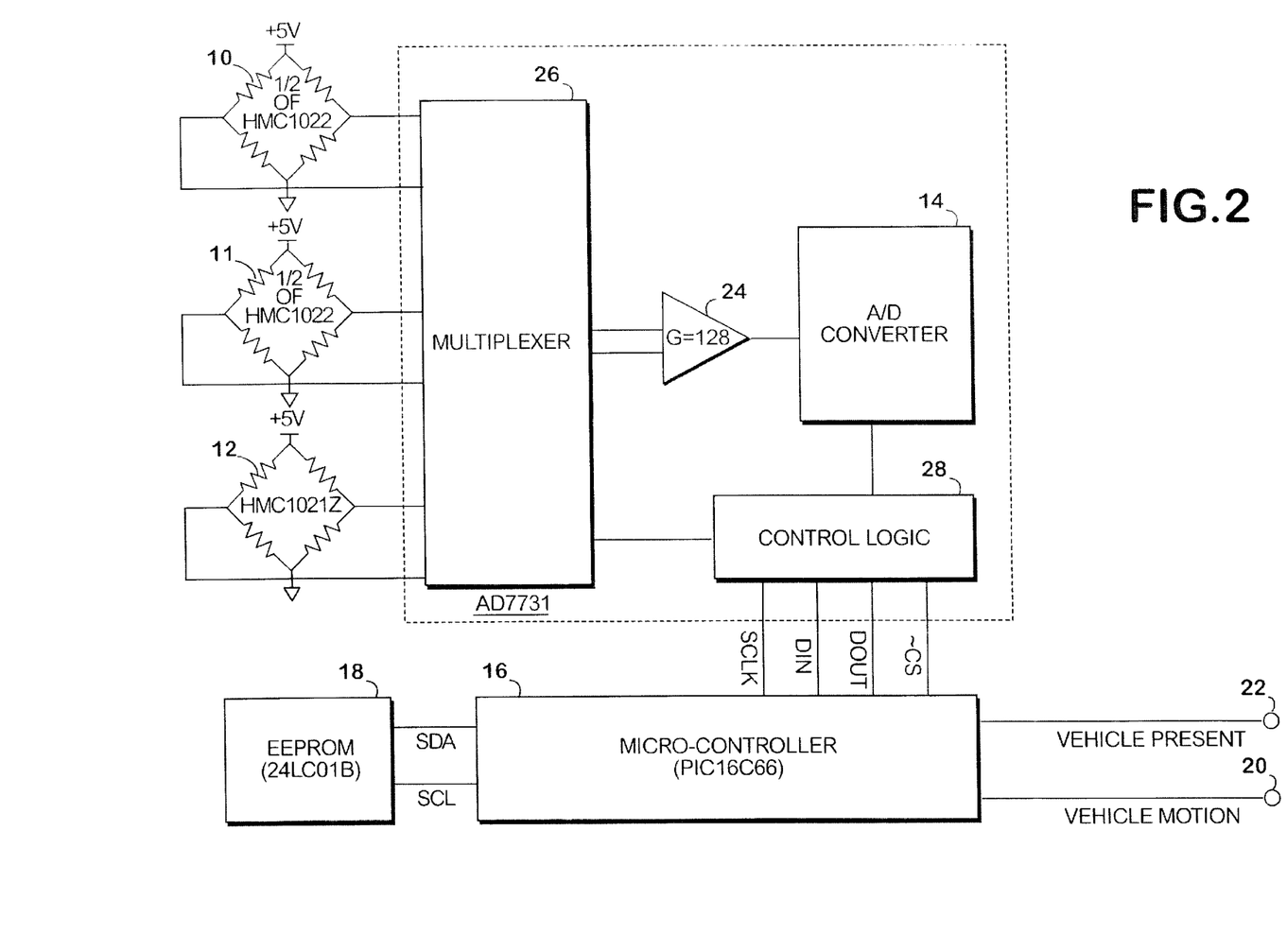
FIG. 2 is an electrical block diagram of the preferred embodiment of the magnetic vehicle system which practices the present invention.

Referring to FIG. 1, magnetic vehicle sensors 2 are securely mounted to a rigid, non-movable object within a radius of 24" from the vehicle location 1. Anisotropic magneto resistive wheatstone bridge sensors commercially available from Honeywell Inc. of Minneapolis. Minnesota are used in the preferred embodiment. Referring to FIG. 2, three of these sensors 10, 11 and 12 are used to provide respective x, y and z measurements of the magnetic field strength. These three signals are multiplexed through a single analog to digital converter 14 and input to a micro-controller 16. Though specific electronic components and models are shown, it is understood that other models and devices can be used to implement the invention as well.

Figure 3:
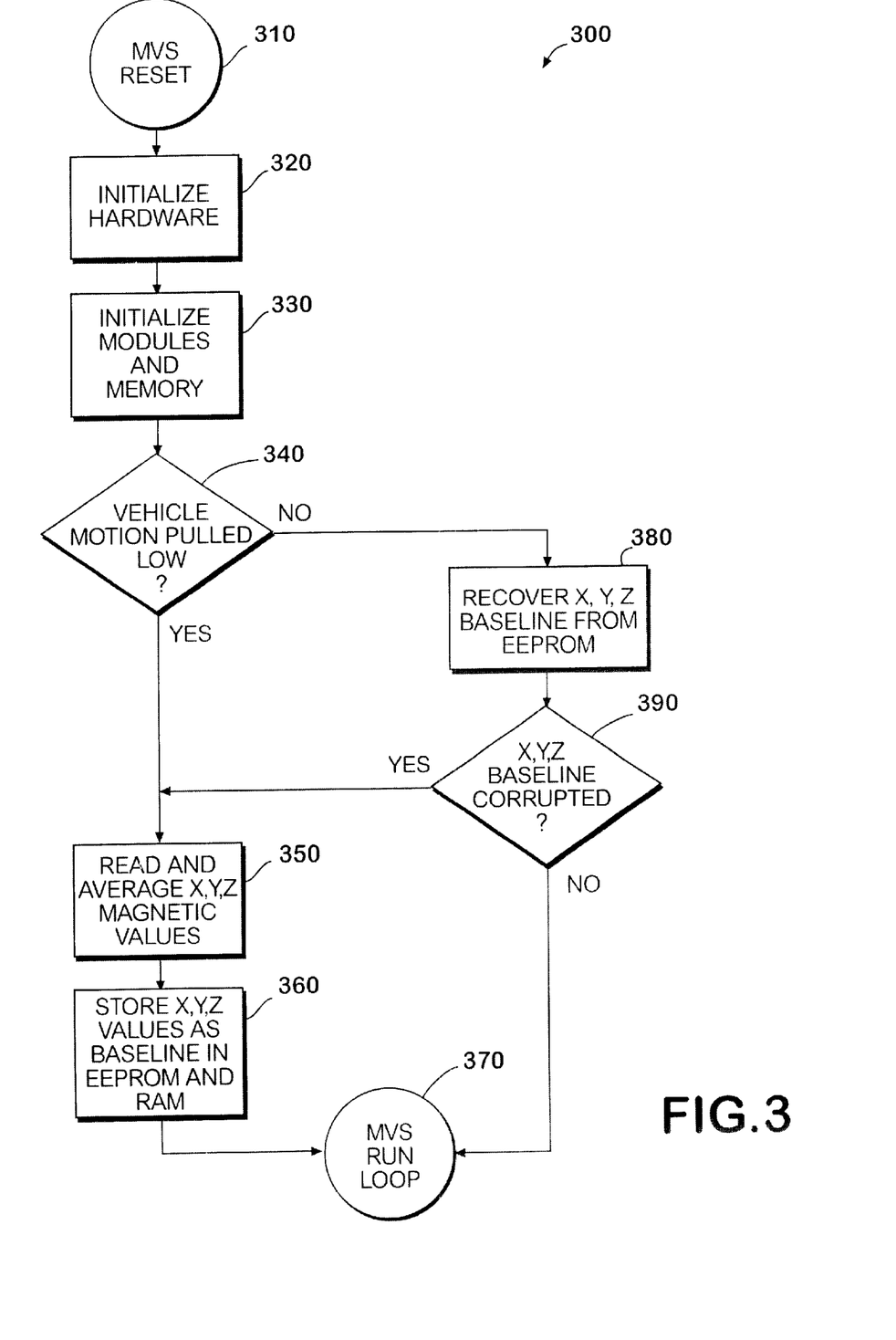
FIG. 3 is a flow chart of a reset program executed by the micro-controller in the system of FIG. 2 to update the measurement of the ambient magnetic field when a vehicle is not present.
Figure 4:
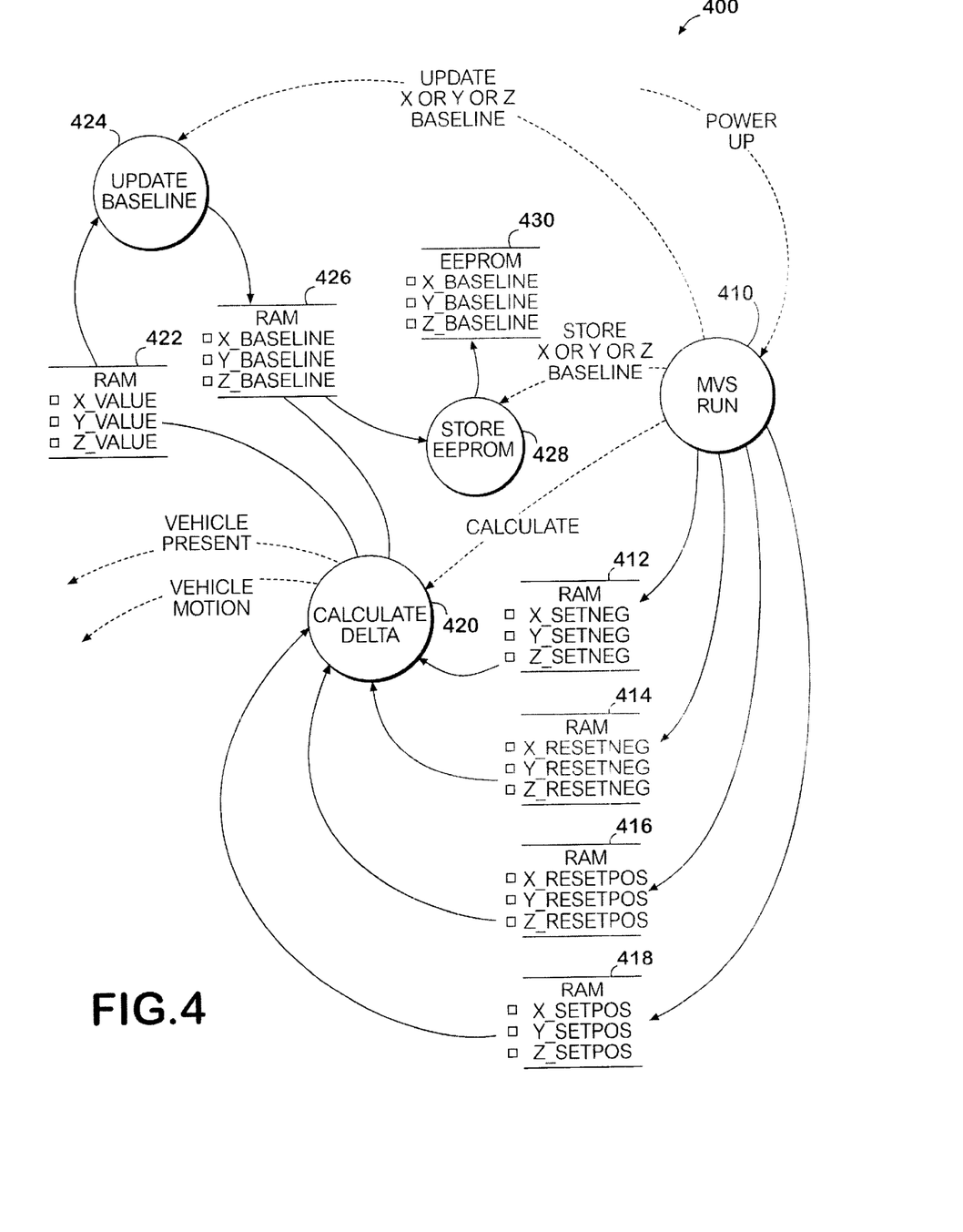
FIG. 4 is a data flow diagram which illustrates the data produced by the run program of FIG. 5.
Figure 5:
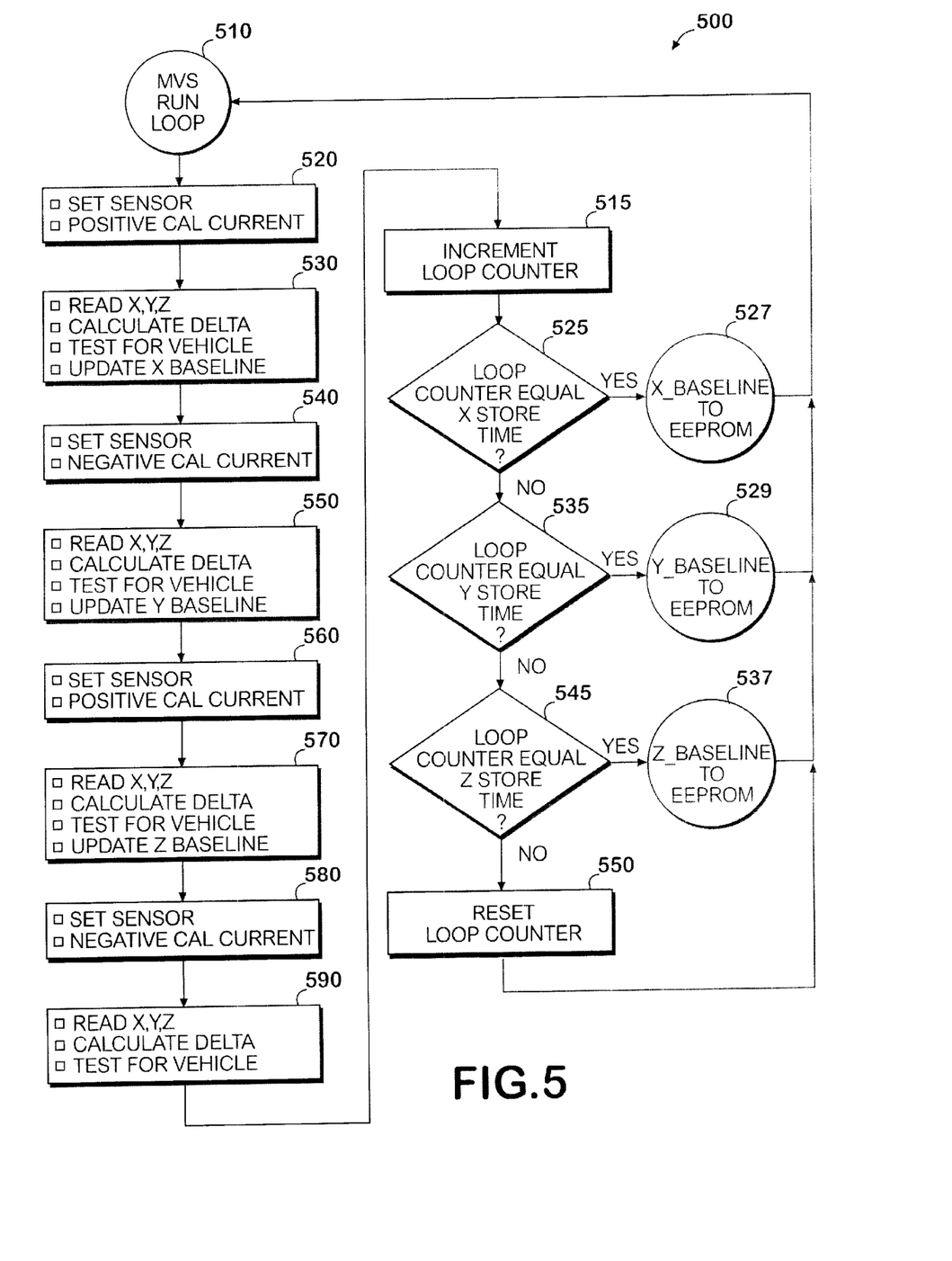
FIG. 5 is a flow chart of a run program executed by the micro-controller in the system of FIG. 2 to test for the presence of a vehicle.
Figure 6:
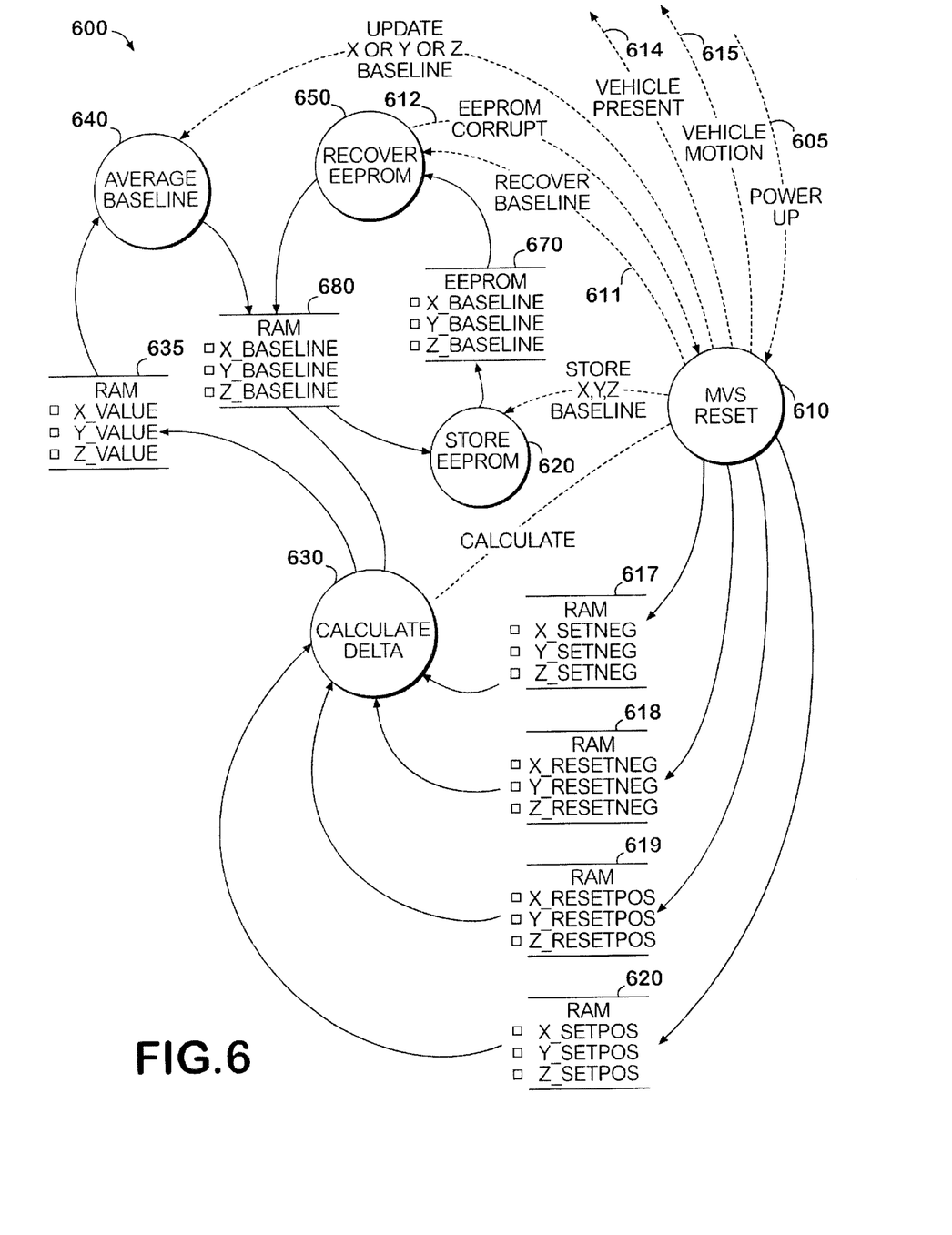
FIG. 6 is a data flow diagram which illustrates the data produced by the reset program of FIG. 3.

The micro-controller 16 operates under the direction of stored programs illustrated in FIGS. 3–6. A reset program illustrated in FIGS. 3 and 6 is performed at power-up of the system or if the baseline ambient magnetic field stored in an electrically erasable read-only memory 18 is corrupted. This reset program tests a "vehicle motion" input 20, and if no vehicle is present, the ambient magnetic field is measured and stored in the EEPROM 18. To protect the contents of the EEPROM 18, it is stored redundantly with a checksum.

The micro-controller 16 provides outputs 22 and 20. Output 20 is normally used to indicate if the vehicle is in motion. However, output 20 can be pulled low to indicate to the micro-controller 16 that an ambient initialization (FIGS. 3 and 6) can be performed. Vehicle present line 22 is activated to an active or inactive state by the micro-controller based on the vehicle detection process of FIGS. 4 and 5. The micro-controller 16 communicates with the control logic 28 which sends control signals to the multiplexer 26 and the A/D converter 14. The multiplexer 26 receives analog signals from the three sensor devices and selects the signal to be digitized at any given time. The multiplexer 26 outputs the chosen signal from one of the sensor devices and amplifier 24 amplifies the signal to a level suitable for digitization. A/D converter 14 then digitizes the signal and passes the digitized values to the control logic 28 which then passes them to the micro-controller 16 for use in the reset and run processes of FIGS. 3–6.

The run program is performed by the micro-controller 16 after the baseline ambient magnetic field values have been stored in the EEPROM 18. As shown in FIGS. 4 and 5, the three sensor inputs are read and the x, y and z components of the earth's magnetic field are calculated. The earth's magnetic field B has three orthogonal components Bx, By and Bz. Four measurements (RD1, RD2, RD3, RD4) are made with each sensor 10, 11 and 12 under the following four conditions:

RD1, following a sensor "set" pulse, a positive calibration current is applied to the sensor;

RD2, following a sensor "set" pulse, a negative calibration current is applied to the sensor;

RD3, following a sensor "reset" pulse, a positive calibration current is applied to the sensor;

RD4, following a sensor "reset" pulse, a negative calibration current is applied to the sensor.

The "set" pulse causes the sensor to have a positive gain (sensitivity). The "reset" pulse causes the sensor to have a negative gain (sensitivity).

$$RD1 = \text{Offset} + \text{GainSet}*B + \text{GainSet}*\text{Cal+}$$

$$RD2 = \text{Offset} + \text{GainSet}*B + \text{GainSet}*\text{Cal-}$$

$$RD3 = \text{Offset} - \text{GainReset}*B - \text{Gaineset}*\text{Cal+}$$

$$RD4 = \text{Offset} - \text{GainReset}*B - \text{GainReset}*\text{Cal-}$$

From these four measurements one component (Bx, By, Bz) of the earth's magnetic field is calculated:

$$\text{RawValue} = (RD1 + RD2 - RD3 - RD4)/4$$

$$\text{AvgGain} = (RD1 - RD2 - RD3 + RD4)/4$$

$$\text{Value} = \text{RawValue}/\text{AvgGain}$$

During this process the magnetic field sensors 10, 11 and 12 are calibrated, where Value=magnetic field component Bx, By, or Bz Offset=the sensor bridge offset;

GainSet=gain following a set pulse;

GainReset=gain following a reset pulse;

Cal+=Calibration current in a "+" direction;

Cal-=calibration current in a "-" direction.

The measured x, y and z values are compared with the baseline x, y and z values stored in the EEPROM 18, and if the magnetic field is significantly changed from the ambient field, a vehicle present signal is indicated at output 22. The following equations are used to calculate the Delta caused by field perturbations created by the vehicle. (Note; N_BaseLine is the long term average of N_Value.)

$$X\_\text{Delta} = \text{absolute value of } (X\_\text{Value} - X\_\text{BaseLine})$$

$$Y\_\text{Delta} = \text{absolute value at } (Y\_\text{Value} - Y\_\text{BaseLine})$$

$$Z\_\text{Delta} = \text{absolute value of } (Z\_\text{Value} - Z\_\text{BaseLine})$$

$$\text{Delta} = X\_\text{Delta} + Y\_\text{Delta} + Z\_\text{Delta}$$

If a vehicle is not present, the measured x, y and z values are assumed to be the current ambient magnetic field level and these are used to update the baseline x, y and z values stored in the EEPROM 18. These update measurements are low-pass filtered to provide an accurate indication of long term changes in the ambient magnetic field measured by the sensors 10, 11 and 12.

FIG. 3 depicts the operational flow of an initialization process performed by a processing module, according to the present invention, to determine a baseline value indicative of the ambient magnetic filed value for the detection zone. The process 300 begins at operation 310 when a magnetic anomaly detector system powers up after installation in the intended working environment or after resetting a system previously installed. The initialization operations 320 and 330 cause the hardware, modules and memory to prepare for processing of signals input from the sensor device. The Vehicle Motion input signal is tested in the Vehicle Motion test operation 340. In one embodiment, the vehicle motion input signal is generated manually by a switching operation that pulls the vehicle motion signal low when it is certain that no anomaly, or in this specific case a vehicle, lies in the detection zone. In this situation, the baseline signal indicative of the ambient magnetic intensity can be accurately determined.

If the Vehicle Motion signal is pulled low indicating with certainty that no vehicle is in the detection zone, then in this embodiment where three sensors are used to measure three orthogonal axes' (X, Y, and Z) magnetic field intensities (Bx, By, and Bz,), Read/Averaged at operation 350 removes essentially all error components and produces a true magnetic intensity value for each sensor device. Within the Read/Average operation 350, the magnetic sensor measures the magnetic field in detection zone. In one embodiment the sensor takes four measurements (RD1, RD2, RD3 and RD4), each one after a new condition has occurred.

To create each of the four conditions in one embodiment, first and second orthogonal conductive coils are located proximate to the magnetic sensor device and may be integrated into it. To create the first condition suitable for the first intensity measurement (RD1), a set pulse of current is applied to the first coil, positioned perpendicular to the axis along which measurements are taken by the sensor device. Then a calibration current is applied to the second coil, positioned parallel to the axis of measurement of the sensor, in a positive direction (a "positive" calibration current). While this calibration current is applied, measurement RD1 is taken.

Under the second condition suitable for a second measurement (RD2), a set pulse is applied to the first coil in one embodiment, and a calibration current is applied through the second coil but in the opposite direction (a "negative" calibration current). The measurement RD2 is taken while the calibration current is applied. In other embodiments, the set pulse utilized for the RD1 measurement can be relied upon for RD2 so that after a positive calibration current is applied for RDI, a negative calibration current is applied for RD2 without reapplying the set pulse.

Under the third condition suitable for a third measurement (RD3), a reset pulse current is applied to the first coil in a direction opposite to the set pulse. A positive calibration current is then applied through the second coil. While the positive calibration current is applied, measurement RD3 is taken.

Under the fourth condition suitable for a fourth measurement (RD4), in one embodiment a reset pulse is applied to the first coil, and then a negative calibration current is applied through the second coil. While the negative calibration current is applied, the measurement RD4 is taken. Again, in other embodiments, the reset pulse need not be reapplied for RD4, but RD4 may rely on the initial reset pulse applied before RD3 was taken.

The Read/Average operation implements the computations involving RD1–RD4 previously described to produce a baseline intensity value free of error components for the sensor device of a given axis. Note that in one embodiment, the anomaly detector implements three sensor devices, one for each of the three orthogonal axes. The number of sensor devices may vary depending upon the application and desired accuracy of the anomaly detector. Typically the operation 350 takes several measurement samples for RD1–RD4 to produce several baseline values for each axis, and those baselines are stored as a running average.

After the Read/Average operation 350 completes, the Baseline Maintenance operation 360 begins. In one embodiment, this operation includes storing the baseline field value for each sensor device in a non-volatile memory and volatile memory (e.g., an EEPROM and RAM, respectively). Then the run process can begin at operation 370 to begin detecting whether an anomaly is present.

If the Vehicle Motion test operation 340 yields a high on the Vehicle Motion input, the ambient intensity is not to be measured so the Baseline recovery operation 380 begins. In this operation, a stored baseline is retrieved from memory, and then the Corruption Test operation 390 begins. This operation evaluates the baseline intensity values, checking for invalid data. If the data is corrupt, then the Read/Average operation 350 initiates to compute baseline values based on the current contents of the detection zone. If the stored baseline values are not corrupt, the test initialization process ends and the run operation of FIG. 5 begins.

FIG. 6. is a data flow diagram 600 which illustrates the data flow of the reset program of FIG. 3. After power-up at operation 405 the hardware modules and memory are initialized. The MVS Reset process 610 then tests the Vehicle Motion line 615 to determine whether a vehicle is present. In one embodiment, the signal on the Vehicle Motion line is pulled either high or low, depending on how a system attendant actuates a push bottom device that is coupled to an interface that generates the appropriate signal on the Vehicle Motion Line. If the Vehicle Motion line is high, the MVS Reset process 610 commands that the Baseline is recovered from memory 611. Then the Recover Memory process 650 sends baseline data in this example from an EEPROM 670 to RAM 680. The Recover Memory process 650 signals to the MVS Reset module 610, whether or not the EEPROM data is corrupt 612. If the recovered Baseline data is corrupt, then the MVS Reset process causes a magnetic field measurement to be taken under each of the 4 conditions discussed above regarding FIG. 3 (RD1, RD2, RD3 and RD4) along the x, y and z-axis. Each of the four measurements for each axis is stored in RAM 617–620, however, such measurements are not required to be performed in any particular order, so long as each measurement is taken under each condition for the axis of interest.

Once these measurements are stored in RAM 617–620, the MVS Reset process 610 commands the Calculate Delta process 630 to initiate using the measurements in RAM 617–620. The Calculate Delta operation 630 uses the equation discussed above regarding FIG. 3, the AveGain and the RawValue to find the values representative of the magnetic field measured in the detection zone which are stored in RAM 635.

Then these values in RAM 635 are used in the Average Baseline process 640. However, when the Baseline data is corrupt the values in RAM 635 are simply stored in the EEPROM 670 as the new Baseline values when the MVS Reset process 610 commands the Store EEPROM process 620 to store the values in RAM 635 in the EEPROM 670. Once the MVS Reset process 610 determines that the recovered Baseline data is not corrupt, the MVS Run process of FIGS. 4 and 5 initiates.

Alternatively, if the MVS Reset process 610 senses that the Vehicle Motion line is pulled low then the process 610 will proceed to calculate delta just as if it attempted to recover baseline data from the EEPROM 670 by Recover EEPROM process 650 and found that the data was corrupt. For a more detailed discussion of how the MVS Reset module 610 proceeds in this scenario, refer to the discussion above regarding this process after corrupt baseline data is discovered.

FIG. 5 depicts the operational flow of a run program executed by the processing module in the system of FIG. 2 to test for magnetic anomalies once the system has been initialized with valid baseline values representing the ambient magnetic intensity. The run program begins at operation 510 upon completion of the reset initialization operations of FIG. 3. The sensor operation 520 establishes the condition for RD1 (discussed above with regard to FIG. 4). The read operation 530 then measures the magnetic field intensity within the detection zone at each sensor device. The processor calculates the intensity (value) for each sensor device based on the new RD1 for each device and the RD2–RD4 for each device that were determined from a previous loop or the initialization process for the first iteration.

The Delta value is determined by calculating the difference between the calculated magnetic field (value) and the Baseline Magnetic field value for each sensor. The Delta's for each sensor device are summed to produce a total delta which is compared to the total baseline value for the detection zone. If the delta is sufficiently changed from ambient, then a vehicle is present. A change that is sufficient is typically determined beforehand and stored in memory. The level of change necessary to indicate the anomaly is determined by storing empirical data generated for the specific application for the anomaly detector. If a vehicle is not present, the baseline for the x-axis device is updated by factoring in the most recent intensity into the long-term running average. The other 2 axes could be updated as well, but one is updated at a time for processing efficiency.

The second set sensor operation 540 causes the condition for RD2 to occur, and then the second Read operation 550 begins. In the embodiment shown, the second Read operation 550 performs the same functions as the first Read operation except that the y-axis component of the Baseline value is updated, instead of the x-axis if no vehicle is detected based on the new total delta which has been calculated based on the new RD 1 and RD2 and the old RD3 and RD4.

The first Reset operation 580 begins and causes the condition for RD3 to occur. The third Read operation 570 initiates, and includes the same processes as previous Read operations, 530 and 550, except the z-axis components of the Baseline value is updated when no vehicle is present base on the new total delta computed from the new RD1–RD3 and the old RD4.

The second Reset operation 580 causes the condition for RD4 to occur, and the fourth Read operation 590 begins upon the occurrence of the RD4 condition. The fourth Read operation 590 is the same as the previous Read operation except no portion of the Baseline is updated if a vehicle is not present and the delta is based on the new RD1–RD4 determined in the current operational loop.

FIG. 5 assumes that Baseline values have already been determined from the initialization process of FIG. 3 and then maintained and updated in memory. In this exemplary embodiment, when the Read operation, 530, 550 and 570 update the baseline, these values are maintained in a volatile memory. In this embodiment, after the fourth Read operation 590 a loop counter is incremented at operation 515. Depending upon the loop count determined in query operations 525, 535, or 545, either the x sensor baseline value, y sensor baseline value, or z sensor baseline value stored in non-volatile memory is updated at operations 517, 527, or 537, respectively. If the loop count reaches a preset maximum value indicating that the x, y, and z baselines values have been updated in the non-volatile memory, the loop count is reset at operation 550.

FIG. 4, similarly to FIG. 6, depicts that data flow of the MVS run operation that occurs once the baseline value has initially been set as shown in FIGS. 3 and 6. As was described for FIG. 6, the RD1–RD4 measurements for each axis are taken by the MVS Run process and stored in RAM 412, 414, 416, and 418. The data from the measurements are used by the delta calculation process 420. The delta value is used to detect the anomaly when compared against the long term average baseline stored in RAM 426. The intensity data for each sensor from the delta calculation process 420 are stored in RAM 422 and are factored into the long term average for the baseline value at operation 424 when no anomaly has been detected by the delta process 420. The long term average is stored in RAM 426 and may also be used to update the non-volatile memory 430 through store process 428. Providing a back-up of the baseline value permits the system to return to operation without reinitialization of the baseline if power is lost and restored.

While the invention has been particularly shown and described with reference to preferred embodiments thereof, it will be understood by those skilled in the art that various other changes in the form and details may be made therein without departing from the spirit and scope of the invention.

We claim:

1. A magnetic anomaly detector comprising:
   a sensor device that is located proximate to a detection zone and that measures a magnetic field and generates a signal representing the intensity of the measured magnetic field; and
   a processing device for processing said signal and generating an output signal indicating the presence of a magnetic anomaly in the detection zone;
   wherein the processing device stores a baseline signal, said baseline signal representing an ambient magnetic field intensity where no anomaly is present within the detection zone, and the baseline signal is compared with the signal indicating the intensity of the magnetic field measured by the sensor device.

2. A magnetic anomaly detector comprising:
   a sensor device that is located proximate to a detection zone and that measures a magnetic field and generates a signal representing the intensity of a magnetic field;
   a processing device that processes said signal and generates an output signal indicating the presence of a magnetic anomaly in the detection zone;
   wherein the processing device stores a baseline signal, said baseline signal representing an ambient magnetic field intensity within the detection zone, and the baseline signal is compared with the signal representing the intensity of the magnetic field measured within the detection zone at the sensor; and
   wherein the processing device periodically updates the baseline signal in view of changes in the ambient magnetic field within the detection zone.

3. A magnetic anomaly detector, comprising:
   a sensor device that is located proximate to a detection zone that measures a magnetic field and generates a sensor output signal representative of the intensity of the measured magnetic field; and
   a processing device for generating an output signal indicating the presence of a magnetic anomaly in the detection zone, wherein the processing device is configured to
      generate a pulsed magnetic field in a first direction relative to the sensor device;
      generate a constant magnetic field in a second direction orthogonal to the first direction and measuring the resulting sensor output signal to produce a first value,
      generate a constant magnetic field in a third direction orthogonal to the first direction and opposite to the second direction and measuring the resulting sensor output signal to produce a second value,
      generate a pulsed magnetic field in a fourth direction opposite the first direction;
      generate a constant magnetic field in the second direction and measuring the resulting sensor output signal to produce a third value,
      generate a constant magnetic field in the third direction and measuring the resulting sensor output signal to produce a fourth value,
      average the first value, the second value, a negative of the third value, and a negative of the fourth value to produce a first averaged value;
      average the first value, a negative of the second value, the negative of the third value, and the fourth value to produce a second averaged value;
      scale the first averaged value by a reciprocal of the second averaged value to produce a measured magnetic field value signal; and
      measure a difference between the measured magnetic field value signal and a baseline signal representing an ambient magnetic field intensity within the detection zone to detect and indicate the presence of an anomaly.

4. A magnetometer, comprising:
   a sensor device that is located proximate to a detection zone that measures a magnetic field and generates a sensor output signal representative of the intensity of the measured magnetic field;
   a processing device for generating a measured magnetic field value signal indicating the intensity of the measured magnetic field, the processing device configured to
      generate a pulsed magnetic field in a first direction relative to the sensor device;
      generate a constant magnetic field in a second direction orthogonal to the first direction and measure the resulting sensor output signal to produce a first value,
      generate a constant magnetic field in a third direction orthogonal to the first direction and opposite to the second direction and measure the resulting sensor output signal to produce a second value,
      generate a pulsed magnetic field in a fourth direction opposite the first direction;
      generate a constant magnetic field in the second direction and measure the resulting sensor output signal to produce a third value,
      generate a constant magnetic field in the third direction and measure the resulting sensor output signal to produce a fourth value,
      average the first value, the second value, a negative of the third value, and a negative of the fourth value to produce a first averaged value;
      average the first value, a negative of the second value, the negative of the third value, and the fourth value to produce a second averaged value;
      scale the first averaged value by a reciprocal of the second averaged value to produce the measured magnetic field value signal indicative of the intensity of the measured magnetic field.

5. A method of detecting a magnetic anomaly, comprising:
   measuring an intensity of a magnetic field with a sensor device within a detection zone;
   generating a sensor device signal that represents the intensity of the magnetic field; and comparing, within a processor device, a baseline signal stored by the processor device that represents an ambient magnetic field value where no anomaly is present in the detection zone to the generated sensor device signal to detect the presence of a magnetic anomaly in the detection zone.

6. A method of detecting a magnetic anomaly, comprising:

measuring an intensity of a magnetic field with a sensor device within a detection zone;

generating a sensor device signal that represents the intensity of the magnetic field;

comparing, within a processor device, a baseline signal stored by the processor device that represents an ambient magnetic field value in the detection zone to the generated signal to detect the presence of a magnetic anomaly in the detection zone; and periodically updating, within the processor device, the baseline signal in view of changes in the magnetic field within the detection zone.

7. A method of measuring a magnetic anomaly in a detection zone with a sensor device that produces an output signal representative of the intensity of the magnetic field within the detection zone, comprising:

generating a pulsed magnetic field in a first direction relative to the sensor device;

generating a constant magnetic field in a second direction orthogonal to the first direction and measuring the resulting sensor output signal to produce a first value, generating a constant magnetic field in a third direction orthogonal to the first direction and opposite to the second direction and measuring the resulting sensor output signal to produce a second value, generating a pulsed magnetic field in a fourth direction opposite the first direction;

generating a constant magnetic field in the second direction and measuring the resulting sensor output signal to produce a third value, generating a constant magnetic field in the third direction and measuring the resulting sensor output signal to produce a fourth value, averaging the first value, the second value, a negative of the third value, and a negative of the fourth value to produce a first averaged value;

averaging the first value, a negative of the second value, the negative of the third value, and the fourth value to produce a second averaged value;

scaling the first averaged value by a reciprocal of the second averaged value to produce a measured magnetic field value signal indicative of the magnetic intensity measured; and measuring a difference between the measured magnetic field value signal and a baseline signal representing an ambient magnetic field intensity within the detection zone to detect and indicate the presence of an anomaly.

8. A method for measuring the intensity of a magnetic field, comprising:

measuring a magnetic field with a sensor device and generating a sensor output signal representative of the intensity of the measured magnetic field;

generating a measured magnetic field value signal indicating the intensity of the measured magnetic field with a processing device, the generating act comprising:

generating a pulsed magnetic field in a first direction relative to the sensor device;

generating a constant magnetic field in a second direction orthogonal to the first direction and measuring the resulting sensor output signal to produce a first value, generating a constant magnetic field in a third direction orthogonal to the first direction and opposite to the second direction and measuring the resulting sensor output signal to produce a second value, generating a pulsed magnetic field in a fourth direction opposite the first direction;

generating a constant magnetic field in the second direction and measuring the resulting sensor output signal to produce a third value, generating a constant magnetic field in the third direction and measuring the resulting sensor output signal to produce a fourth value, averaging the first value, the second value, a negative of the third value, and a negative of the fourth value to produce a first averaged value;

averaging the first value, a negative of the second value, the negative of the third value, and the fourth value to produce a second averaged value;

scaling the first averaged value by a reciprocal of the second averaged value to produce the measured magnetic field value signal indicative of the intensity of the measured magnetic field.

* * * * *